UNITED STATES PATENT OFFICE.

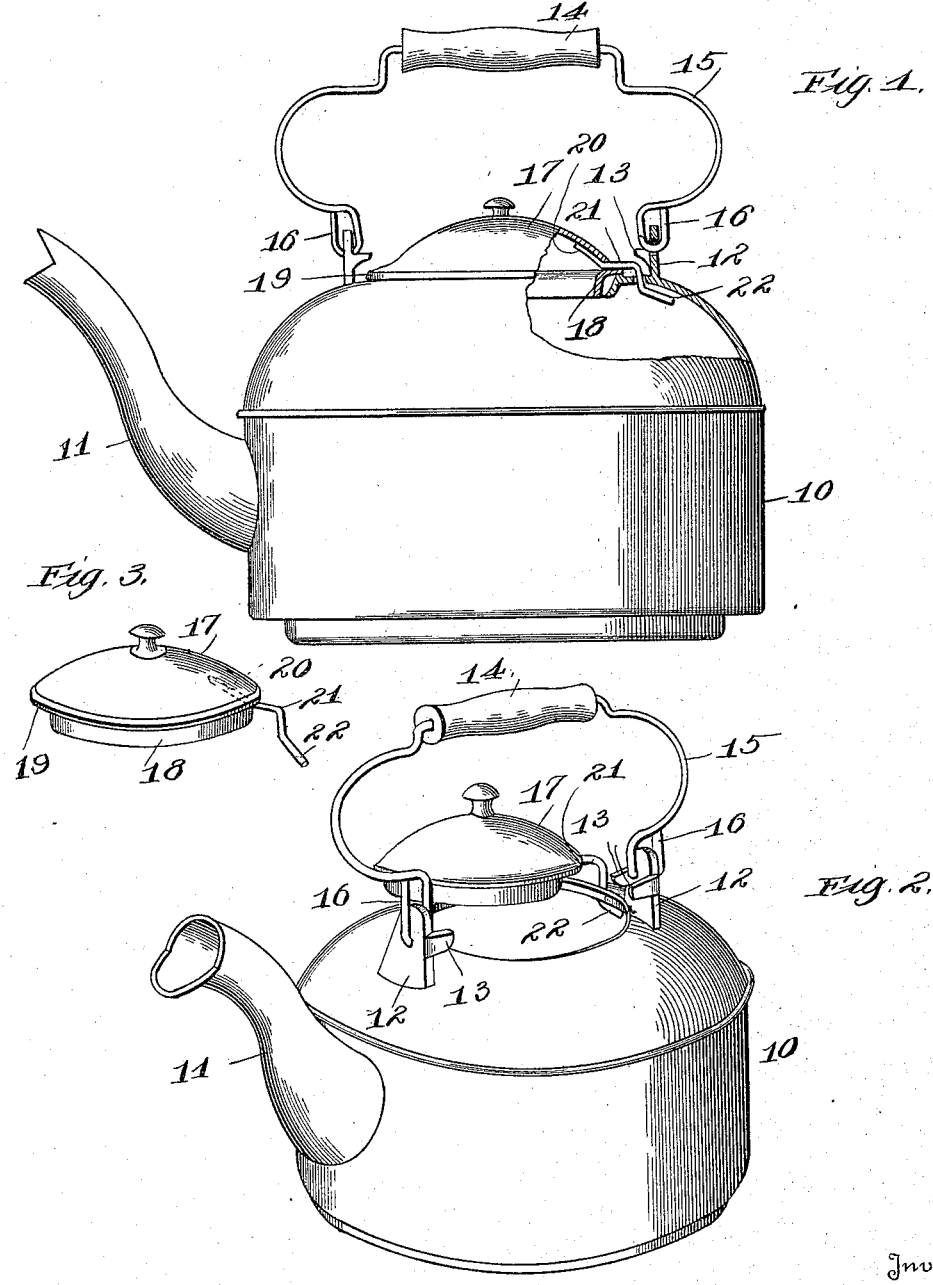

FRANK H. WESTBURY, OF LONDON, ONTARIO, CANADA, ASSIGNOR TO THE McCLARY MANUFACTURING CO., OF LONDON, ONTARIO, CANADA.

TEA-KETTLE COVER.

1,147,472.        Specification of Letters Patent.        Patented July 20, 1915.

Application filed January 9, 1914. Serial No. 811,503.

*To all whom it may concern:*

Be it known that I, FRANK H. WESTBURY, a subject of the King of Great Britain, and residing at the city of London, in the county of Middlesex, in the Province of Ontario, Canada, have invented a new and useful Tea-Kettle Cover, of which the following is a specification.

This invention relates to certain new and useful improvements in domestic cooking vessels.

An object of the invention is to provide a cover for a tea-kettle or similar vessel that will be effectively retained in position on the body when the handle of the vessel is in a vertical position, and which cover may be readily removed only when the handle is in a horizontal position.

These objects are obtained by a device which is extremely simple in construction and inexpensive to manufacture and the efficient operation thereof will be readily apparent.

With the above and other objects in view which will appear as the nature of the invention is better understood, the same consists in the novel construction, combination and arrangement of parts to be hereinafter more fully described and then claimed, reference being had to the accompanying drawing by like characters throughout the several views, and wherein:—

Figure 1 is a side elevational view of a kettle partly broken away, illustrating my invention. Fig. 2 is a perspective view with the cover removed, and, Fig. 3 is a perspective view of the cover with the retaining member.

Referring more particularly to the drawing accompanying this application, 10 designates a tea-kettle provided with an opening in the upper wall or top thereof and further provided with the usual spout 11. The upper wall of the kettle 10 is provided with a pair of diametrically-oppositely-disposed upstanding lugs 12 and carried by the said lugs 12 are inwardly-directed ears 13. A handle 14 is provided, the bail 15 of which has its ends passing through suitable openings provided in the lugs 12 and bent as at 16 to constitute retaining means therefor. The handle 14 is held in a substantially horizontal position when caused to be moved to either side of the kettle by engaging the ears 13 carried by the lugs 12.

Mounted in the opening formed in the top of the kettle 10 is a cover 17. The cover 17 is provided with a depending annular flange or collar 18 to be received within said opening and with a laterally-extending flange 19 resting on the top wall of the opening.

Means are provided which will prevent the cover 17 from being wholly removed from the kettle 10 when the handle 14 is in a vertical position and consists of an approximately Z-shaped retaining member 20 suitably-secured to the cover and extending laterally therefrom in a slight downward direction. This member 20 is constructed preferably from wire and is provided with an angular bend 21 and continues as at 22. A suitable opening is provided in the top wall of the kettle 10 at a point intermediate one of the lugs 12 and the opening in the kettle, for the reception of the wire-retaining member 20.

With the bail 15 in upright or vertical position, the cover 17 may be turned laterally and substantially clear the filling opening of the kettle as shown in Fig. 2. Unless the cover be swung around laterally, either to one side or the other, to an extent which will bring the entire cover beyond the vertical plane occupied by the bail, it is impossible to tilt the cover on its retaining member 20 sufficiently to permit of said member being withdrawn from the aperture in the kettle top, since the cover would contact either with the handle 14 or bail 15. Also, with the cover raised as in Fig. 2 to permit its being turned laterally, the bend 21 of the retaining member has been so positioned with relation to the adjacent lug 12, that a tilting of the cover to withdraw the retaining member would bring the bend 21 into engagement with the lug, thus arresting the withdrawing movement. With the bend 21 down close to the kettle top however, as in Fig. 1 and the bail swung over horizontally resting upon the ears 13, and out of the way of the cover, the latter may be readily tilted at such angle as to allow of the withdrawal of the retaining member.

What I claim as new and desire to secure by Letters Patent is:—

1. A kettle having its top furnished with two oppositely-alined upstanding lugs, each provided with a pair of inwardly-projecting ears, the kettle having an opening in the top adjacent to one of the lugs, a handle bail having its ends looped through the lugs, and a cover having an approximately-Z-shaped retaining member arranged to project through the opening to permit lateral swinging of the cover, the intermediate bend of the member being disposed to contact with the adjacent lug and ears to prevent removal of the cover except when the bail is in horizontal position.

2. In a device of the class described, a kettle, oppositely disposed lugs carried thereby, a pair of opposed inwardly directed ears carried by each lug, there being an opening in each lug, a handle bail having its ends secured in the lug openings, a cover for the kettle, a wire member carried by the cover, an outwardly bent portion intermediate the ends of the wire member, there being an opening in said kettle in vertical alinement with the ears of one lug adapted to receive said wire member to retain the cover on the kettle.

3. A device of the class described, comprising a kettle, upstanding bail supporting lugs carried by said kettle, opposed inwardly directed ears carried by said lugs, there being an opening in the upper wall of the kettle, a cover for the kettle, a wire member projecting laterally from one edge of the cover having a portion thereof extending in a horizontal plane, the remaining portion being bent in opposite directions with the free end of the same received in the aforesaid opening.

4. A device of the class described comprising a kettle, a cover therefor, lugs carried by the kettle, inwardly directed ears carried by the lugs, a bail carried by said lugs, and a wire member carried by the cover bent to substantially Z-shape associated with said kettle, lugs and ears to prevent removal of the cover from the kettle.

In testimony whereof, I, have signed in the presence of the two undersigned witnesses.

FRANK H. WESTBURY.

Witnesses:
P. J. EDMUNDS,
E. A. BEDFORD.

Copies of this patent may be obtained for five cents each, by addressing the "Commissioner of Patents, Washington, D. C."